United States Patent Office 3,275,716
Patented Sept. 27, 1966

3,275,716
VINYLIDENE CHLORIDE POLYMER COMPOSITIONS AND FILMS THEREFROM
Glenn C. Wiggins, Midland, Mich., assignor to The Dow Chemical Company, Midland, Mich., a corporation of Delaware
No Drawing. Filed July 17, 1962, Ser. No. 210,563
16 Claims. (Cl. 260—899)

This invention is concerned with vinylidene chloride polymer compositions that are particularly useful for the preparation of films that have relatively high shrinkage properties.

Films of vinylidene chloride polymers, and particularly the normally crystalline vinylidene chloride (i.e. saran) compositions, have been employed in shrink film applications with advantage. One such application has been in the poultry packing field. The prepared poultry are generally inserted into a bag of the film, the film is sealed across the open end, and then the bag and contents are placed in hot water which causes the film to shrink down "skin tight" on the contents.

Unfortunately, the vinylidene chloride polymer or saran films suffer certain disadvantages in this use. The films are difficult to seal and, frequently, after aging at room temperature for a few days, satisfactory seals cannot be obtained, that is, the seals peel open under pressure. Additionally, the saran films have a relatively high tensile modulus in the longitudinal direction. This feature creates a severe shock to the seal at the bottom of the bag when anything of weight, such as poultry, is loaded into the bag. Consequently, care must be taken to see that fresh film is always on hand and that special care is taken in loading the bags. Not only does this create inconvenience and increased costs, but it may be impractical or impossible to have a source of fresh film on hand at all times.

Accordingly, it is the chief concern and primary object of this invention to provide vinylidene chloride polymer compositions that are adapted to be extruded into films, tubes and the like with conventional extrusion techniques, and the films so produced will have excellent sealability, even after extended aging periods, and which films will have a tensile modulus that will withstand loading shock without affecting any prior seals in the film. It is also an object of the invention to provide films of the compositions having these improved features.

These, as well as other objects and advantages, are obtained in and by the practice of the present invention wherein an improved film-forming vinylidene chloride polymer composition is provided comprising, in intimate blended combination, from about 90 to about 99.5 weight percent, based on the weight of the blend, of a vinylidene chloride polymer containing from about 70 to about 95 weight percent of vinylidene chloride copolymerized with from about 30 to about 5 weight percent of another monoethylenically unsaturated monomer copolymerizable with vinylidene chloride, and between about 10 and about 0.5 weight percent, based on the weight of the blend, of a vinyl chloride polymer containing from about 80 to about 95 weight percent of vinyl chloride copolymerized with from about 20 to 5 weight percent of another monoethylenically unsaturated monomer copolymerizable with vinyl chloride.

The vinylidene chloride polymer that is used in the compositions of the present invention is preferably one that will produce a heat shrinkable film having at least about 30 percent shrinkage in boiling water, and advantageously one that will produce a film having a shrinkage between about 45 and 55 percent shrinkage in boiling water. Ordinarily, these polymers are those which contain in the polymer molecule from about 70 to about 95 weight percent of vinylidene chloride copolymerized with another ethylenically unsaturated monomer that is copolymerizable with vinylidene chloride. Beneficially, the vinylidene chloride polymer should have a solution viscosity of at least about 1 centipoise in a 2% solution or orthodichlorobenzene at 120° C.

Exemplary of the ethylenically unsaturated monomers that are copolymerizable with vinylidene chloride and which are useful in the vinylidene chloride polymers of the invention are acrylonitrile, ethyl acrylate, vinyl acetate, and vinyl chloride. By way of example, some of the vinylidene chloride copolymers that are advantageously employed are those copolymers containing from about 88 to about 93 weight percent vinylidene chloride and 12 to 7 weight percent acrylonitrile, copolymers containing from about 88 to 93 percent vinylidene chloride with about 12 to 7 weight percent ethyl acrylate, copolymers containing from about 76 to 88 weight percent vinylidene chloride and 24 to 12 weight percent vinyl acetate, and copolymers containing from about 76 to 88 weight percent vinylidene chloride and 24 to 12 weight percent vinyl chloride. Advantageously and beneficially, vinylidene chloride polymers with from about 9 to 11 weight percent acrylonitrile, or about 9 to 11 weight percent ethyl acrylate, or about 14 to 18 weight percent vinyl acetate, or about 18 to 24 weight percent vinyl chloride are employed in the practice of the invention.

The vinyl chloride polymers that are used to modify the vinylidene chloride polymer in accordance with the practice of the present invention are those which contain from about 80 to 95 weight percent vinyl chloride copolymerized with from about 20 to 5 weight percent of another ethylenically unsaturated monomer that is copolymerizable with vinyl chloride. Thus, the vinyl chloride polymers which can be used with advantage are those containing from about 80 to about 95 weight percent of vinyl chloride copolymerized with between about 20 and 5 weight percent of another ethylenically unsaturated monomer that is copolymerizable with vinyl chloride. Thus, the vinyl chloride polymers which can be used with advantage are those containing from about 80 to about 95 weight percent of vinyl chloride copolymerized with between about 20 and 5 weight percent of a monomer selected from the group, by way of example, of ethyl acrylate, propyl acrylate, butyl acrylate, acrylonitrile, vinyl propionate, vinylidene chloride and vinyl acetate.

The vinyl chloride polymer that is utilized in the present compositions should be compatible with the vinylidene chloride polymer to the extent that it will remain in intimate and uniform distribution throughout the blend when the blend is thermally fused prior to extrusion. In particular, there should not be any "phasing out" of the blended polymers.

As indicated, the polymeric compositions in accordance with the invention comprise from about 90 to about 99.5 weight percent of vinylidene chloride polymer based on the weight of the composition, with from about 10 to about 0.5 weight percent of the vinyl chloride polymer, based on the weight of the composition. Profitably, from about 3 to 5 weight percent of the vinyl chloride polymer, based on the weight of the polymeric compositions, is utilized to modify the vinylidene chloride polymer material in accordance with the invention.

When preparing the polymeric compositions of the invention, it is important that a thorough and complete intimate mixing of the vinyl chloride polymer and vinylidene chloride is effected. This is best accomplished by blending the two polymeric materials while they are in a solid, powdered or pulverulent form. However, other means suited for the purpose may be employed such as mixing the polymers in molten form. This is usually less desirable, though, because of the thermal degradation of the polymers when maintained at melting temperatures.

Films and related shaped articles can be fabricated from the compositions of the invention by any of the conventionally employed fabricating or extruding techniques. Of particular advantage in this regard, is to employ the technique for making film in tubular form.

The films and film tubes prepared in accordance with the present invention have excellent properties and qualities especially applicable to the use as films. Thus, the films of the invention have the same or essentially the same degree of clarity and shrinkability as the unmodified vinylidene chloride polymer film, i.e., film from the vinylidene chloride polymer not having any of the vinyl chloride polymer admixed therewith. The present films have excellent tensile modulus ideally suited to withstand shock and thus prevent damage to any edge seal in the bag formed of the film. Thus, the present films, surprisingly enough, have decreased tensile modulus in the longitudinal direction than the normal unmodified films. This is so even though the vinyl chloride polymers that are added to the vinylidene chloride polymeric materials are harder resins and have higher tensile modulus values. Moreover, the present films can be readily and permanently sealed even after extended aging periods of the film.

Films prepared from the present composition can be used in either oriented or unoriented condition. Thus, unoriented films are especially well suited for preparing laminate structures. The unoriented films provide excellent extensibility to the laminate structure as well as providing desirable permeability.

The following examples further illustrate the invention wherein, unless otherwise specified, all parts and percentages are by weight.

extrusion the freshly extruded tube was super cooled by exterior application of a substantially uniform circumenveloping cascading column of water at an average temperature of about 5 to 10° C. The column of water was applied to the exterior of the tube from a ring-like distributing member encircling the tube having an inner, radially slit jet or nozzle for directing the water on the freshly extruded tube. The distributing member for the temperature regulating water was positioned at about the level of the internal former beneath the extrusion orifice. The so-formed film tube was subsequently collapsed and flattened out after being withdrawn from the orifice and cooled, between a pair of nip rolls rotating to draw the film tube from the die and positioned beneath the orifice of the tube die. During the operation, compressed air was passed into the film tube, the air being circulated within the tube and exhausted to an aspirator device outside the extrusion apparatus by means of a recirculating tube.

The collapsed film tube was then passed through a reheat bath after which it was oriented by being blown into a bubble between two sets of pinch rolls, then it was subsequently collapsed by the second set of pinch rolls and wound into rolls on 6 inch cores.

Two different speeds of wind-up (50 and 100 feet per minute) were utilized in the extrusion operation, in each case producing a 125 gauge film.

Additionally, a control polymer was extruded in the same manner which consisted only of the vinylidene chloride/vinyl chloride copolymer and which did not contain any of the vinyl chloride modifying polymer.

The film so produced, was then subjected to conventional tensile and elongation of a Scott IP-4 Tester at a draw rate of 12 inches/min. The results are set forth in Table I.

*Table I*

| Sample No. | Wt. Percent Vinyl Chloride Vinyl/Acetate Modifying Polymer in Vinylidene Chloride Polymer Based on Wt. of Blend | Reheat Bath Temp. ° C. | Windup Speed ft./min. | Film Properties in Longitudinal Direction | | | |
|---|---|---|---|---|---|---|---|
| | | | | Percent Elong. | Tensile St. p.s.i.×10$^{-2}$ | Relative Modulus [1] | Relative Toughness [2] |
| A1 | 0 | 25 | 50 | 157 | 72.8 | 465 | 1,140 |
| A2 | 0 | 25 | 100 | 144 | 58.3 | 405 | 840 |
| B1 | 3 | 25 | 50 | 187 | 63.3 | 338 | 1,180 |
| B2 | 3 | 25 | 100 | 196 | 58.3 | 297 | 1,140 |
| C1 | 0 | 40 | 50 | 147 | 77.8 | 519 | 1,145 |
| C2 | 0 | 40 | 100 | 109 | 54.0 | 495 | 489 |
| D1 | 3 | 40 | 50 | 172 | 57.5 | 334 | 990 |
| D2 | 3 | 40 | 100 | 170 | 55.0 | 324 | 935 |

[1] Relative Modulus = $\frac{\text{Tensile strength (p.s.i., ultimate)}}{\text{Percent elongation (ultimate)}} \times 10$.

[2] Relative Toughness = Tensile strength × percent elongation × 10$^{-3}$.

EXAMPLE 1

About 97 pounds of a copolymer containing about 80 percent vinylidene chloride and about 20 percent vinyl chloride copolymerized in polymer molecule were dry blended with 3 pounds of a copolymer of about 87 percent vinyl chloride and about 13 percent vinyl acetate (both polymers being in powder form).

Hydrogenated soya glyceride (melting point about 158° F.) in flake form, an anti-blocking agent, was placed in a heated reservoir above an extrusion unit and heated to about 170° F. The reservoir was adapted to deliver the molten soya glyceride to the top of the internal former of the extrusion unit by means of suitable valving and conduit means so as to apply the glyceride to the internal film surfaces.

The modified vinylidene chloride polymer blend was fused and extruded at about 165 to 175° C. from a 1¾ inch diameter die vertically downward over a 1½ inch internal former on which was maintained a 1 inch layer of the molten hydrogenated glyceride. Immediately after

EXAMPLE 2

Film was prepared according to the procedure of Example 1 excepting to vary the amount of the vinyl chloride/vinyl acetate copolymer that was added to and blended with the vinylidene chloride polymer. The relative toughness and relative modulus of the films were then determined. These results are presented in Table II.

*Table II*

| Percent Vinyl Chloride/ Vinyl Acetate, Based on Weight of Blend | Percent Elongation | Longitudinal Film Properties | |
|---|---|---|---|
| | | Relative Modulus | Relative Toughness |
| 0 | 145 | 513 | 1,080 |
| 3 | 188 | 340 | 1,200 |
| 5 | 191 | 282 | 1,030 |

EXAMPLE 3

Following the same general extrusion procedure as Example 1, 125 gauge tubular film was extruded from resin composition of about 95 percent, based on the weight of the composition, of a copolymer of about 80 percent vinylidene chloride and about 20 percent vinyl chloride and about 5 percent, based on the weight of the composition, of a copolymer of about 87 percent vinyl chloride and about 13 percent vinyl acetate. A control film, i.e., a film from an 80/20 vinylidene chloride/vinyl chloride copolymer (no modifying copolymer in the composition) was produced in the same manner. The film, in flattened tubular form and bag lengths, was allowed to stand at 70–80° C. for 30 days and then the film was electronically sealed at one end with a water cooled sticky back electrode.

Bag burst tests (which is an effective means of measuring the strength of the seal) were then run on each of the bags by placing the open end of the bag between two plates and injecting air into the bag until the bag broke. The air pressure required to rupture the bag was measured.

In addition to determining the bursting strength, the number of bags showing a partial peel was determined. A bag with an exceptionally good seal is one, which, when subjected to the burst tests, will rupture at the initial joinder of the two film surfaces (initial joinder here meaning the line of joinder as viewed from inside the bag). A partial peel is evidenced by a separation part way or longitudinally through the seal before rupture. A complete peel is evidenced by escape of the air through the outer edge of the seal with no actual rupture of the film. Bags showing partial peel are somewhat objectionable (and full peel is highly objectionable) in that this indicates probably failure of the seal when an object (e.g. turkey) is dropped in the bag and when the film is caused to shrink down tightly over the object. The results of the tests are presented in Table III. All values in Table III are average values of 40–50 tests.

Table III

| Sealing Power (Variac setting of power to sealing electrode, 110 volt source) | Burst Strength (p.s.i.) | | Percent of Bags Showing Partial Peeling | |
|---|---|---|---|---|
| | Film From Control Composition | Film From Vinyl Chloride/Vinyl Acetate-Modified Composition | Film From Control Composition | Film From Vinyl Chloride/Vinyl Acetate-Modified Composition |
| 75 | 10.6 | 11.0 | 100 | 87 |
| 77 | 9.0 | 10.4 | 100 | 87 |
| 79 | 8.7 | 13.5 | 100 | 20 |
| 81 | 9.3 | 14.4 | 100 | 0 |
| 83 | (¹) | | | |

¹ Too hot, melts film.

EXAMPLE 4

In another series of extrusions, and following the same procedure as Example 1, tubular films were extruded from a polymer composition of a copolymer of about 80 percent vinylidene chloride and about 20 percent vinyl chloride modified with different vinyl chloride polymers and in differing amounts. Longitudinal and transverse tensile strength, elongation and shrinkage (in boiling water) were determined as well as relative modulus and toughness. These results are set forth in Table IV. Each value in the table is an average of 72 values at wind-up rates of 50 and 100 feet/minute.

Table IV

| Modifying Copolymer | Percent Modifying Copolymer (Based on Weight of Blend) | Blowup Ratio | Elongation (Percent) | | Tensile Strength (p.s.i.×10⁻²) | | Shrink (Percent) | | Tensile Modulus | | Toughness (Tens. ×Elong.×10⁻³) | |
|---|---|---|---|---|---|---|---|---|---|---|---|---|
| | | | Long. | Trans. | Long. | Trans. | Long. | Trans. | Long. | Trans. | Long. | Trans. |
| None | 0 | 4.22 | 139 | 132 | 70.8 | 104.8 | 50.4 | 47.8 | 505 | 798 | 967 | 1,297 |
| 87% Vinyl Chloride/13% Vinyl Acetate | 3 | 3.62 | 191 | 142 | 60.5 | 110.6 | 48.6 | 46.5 | 317 | 799 | 1,159 | 1,528 |
| 87% Vinyl Chloride/13% Vinyl Acetate | 5 | 3.53 | 207 | 140 | 56.1 | 108.5 | 48.3 | 47.1 | 273 | 805 | 1,166 | 1,570 |
| 80% Vinyl Chloride/20% Vinylidene Chloride ¹ | 3 | 3.86 | 168 | 157 | 67.4 | 104.2 | 50.3 | 44.8 | 413 | 711 | 1,127 | 1,562 |
| 80% Vinyl Chloride/20% Vinylidene Chloride ¹ | 5 | 3.64 | 172 | 154 | 67.0 | 103.7 | 51.1 | 46.3 | 400 | 699 | 1,144 | 1,533 |
| 80% Vinyl Chloride/20% Vinylidene Chloride ² | 3 | 4.05 | 148 | 133 | 66.2 | 108.8 | 53.9 | 49.6 | 456 | 840 | 985 | 1,433 |
| 80% Vinyl Chloride/20% Vinylidene Chloride ² | 5 | 3.75 | 167 | 137 | 66.6 | 101.6 | 52.8 | 48.6 | 406 | 764 | 1,105 | 1,383 |

¹ Solution viscosity at 2% solution in orthodichlore benzene at 120° C=0.85 centipoise.
² Solution viscosity at 2% solution in orthodichlore benzene at 120° C=1.00–1.09 centipoise.

Commensurate excellent results are achieved when other of the vinylidene chloride polymer/vinyl chloride polymer compositions are utilized in the preparation of films in accordance with the invention.

The scope and purview of the present invention is to be gauged in the light of the hereto appended claims rather than strictly from the foregoing illustrative description and specification.

What is claimed is:

1. A composition comprising, in intimate blended relationship, from about 95 to about 97 weight percent, based on the weight of the composition, of a vinylidene chloride polymer containing from about 70 to about 95 weight percent of vinylidene chloride copolymerized with from about 30 to about 5 weight percent of another monoethylenically unsaturated monomer copolymerizable with vinylidene chloride, and from about 5 to about 3 weight percent based on the weight of the composition, of a vinyl chloride polymer containing from about 80 to about 95 weight percent of vinyl chloride copolymerized with from about 20 to about 5 weight percent of another monoethylenically unsaturated monomeric material copolymerizable with vinyl chloride.

2. The composition of claim 1, wherein said vinylidene chloride polymer is a polymer that will produce a film having a shrinkage of at least 30 percent in boiling water.

3. The composition of claim 1, wherein said vinylidene chloride polymer is a polymer that will produce a film having a shrinkage between about 45 and 55 percent in boiling water.

4. The composition of claim 1, wherein said monoethylenically unsaturated monomer copolymerizable with vinylidene chloride is acrylonitrile.

5. The composition of claim 1, wherein said monoethylenically unsaturated monomer copolymerizable with vinylidene chloride is ethyl acrylate.

6. The composition of claim 1, wherein said monoethylenically unsaturated monomer copolymerizable with vinylidene chloride is vinyl acetate.

7. The composition of claim 1, wherein said monoethylenically unsaturated monomer copolymerizable with vinylidene chloride is vinyl chloride.

8. The composition of claim 1, wherein said monoethylenically unsaturated monomer copolymerizable with vinyl chloride is vinyl acetate.

9. The composition of claim 1, wherein said monoethylenically unsaturated monomer copolymerizable with vinyl chloride is ethyl acrylate.

10. The composition of claim 1, wherein said monoethylenically unsaturated monomer copolymerizable with vinyl chloride is vinylidene chloride.

11. The composition of claim 1, wherein said vinylidene chloride polymer is a copolymer of vinylidene chloride with vinyl chloride and said vinyl chloride polymer is a copolymer of vinyl chloride with vinyl acetate.

12. The composition of claim 11, wherein said vinylidene chloride polymer is a copolymer of about 80 weight percent vinylidene chloride and about 20 weight percent vinyl chloride and said vinyl chloride polymer is a copolymer of about 87 percent vinyl chloride and about 13 percent vinyl acetate.

13. An oriented film of the composition set forth in claim 1.

14. An oriented film of the composition set forth in claim 11.

15. An oriented film of the composition set forth in claim 12.

16. An unoriented film of the composition set forth in claim 1.

References Cited by the Examiner

UNITED STATES PATENTS

| | | | |
|---|---|---|---|
| 2,459,125 | 1/1949 | Cheyney | 260—899 |
| 3,136,657 | 6/1964 | Dixler et al. | 260—899 |

MURRAY TILLMAN, *Primary Examiner.*

LEON J. BERCOVITZ, SAMUEL H. BLECH,
*Examiners.*

J. A. KOLASCH, J. WHITE, *Assistant Examiners.*